C. H. LEGGETT.
ADVERTISING DEVICE.
APPLICATION FILED APR. 7, 1917.

1,264,947.

Patented May 7, 1918.
3 SHEETS—SHEET 1.

WITNESSES:
INVENTOR:
Clinton H. Leggett
By Attorneys,

C. H. LEGGETT.
ADVERTISING DEVICE.
APPLICATION FILED APR. 7, 1917.
1,264,947.
Patented May 7, 1918.
3 SHEETS—SHEET 2.
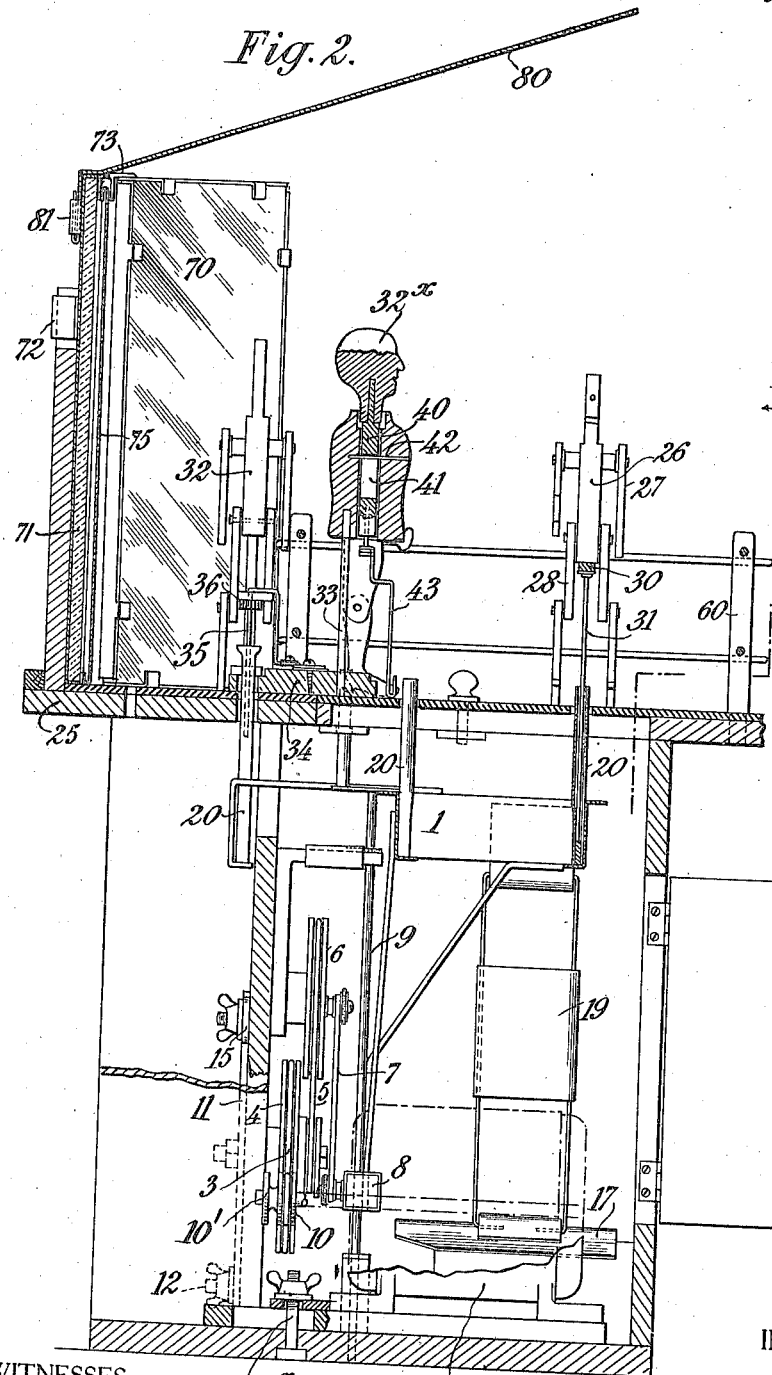
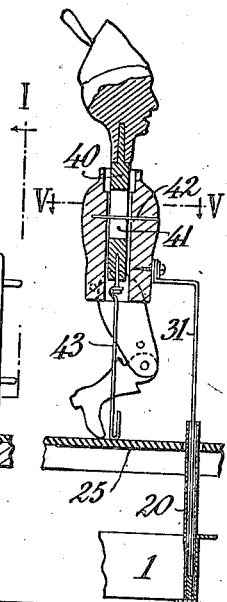
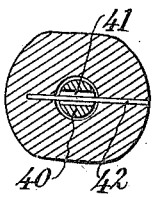
WITNESSES:
INVENTOR
Clinton H. Leggett
By Attorneys,

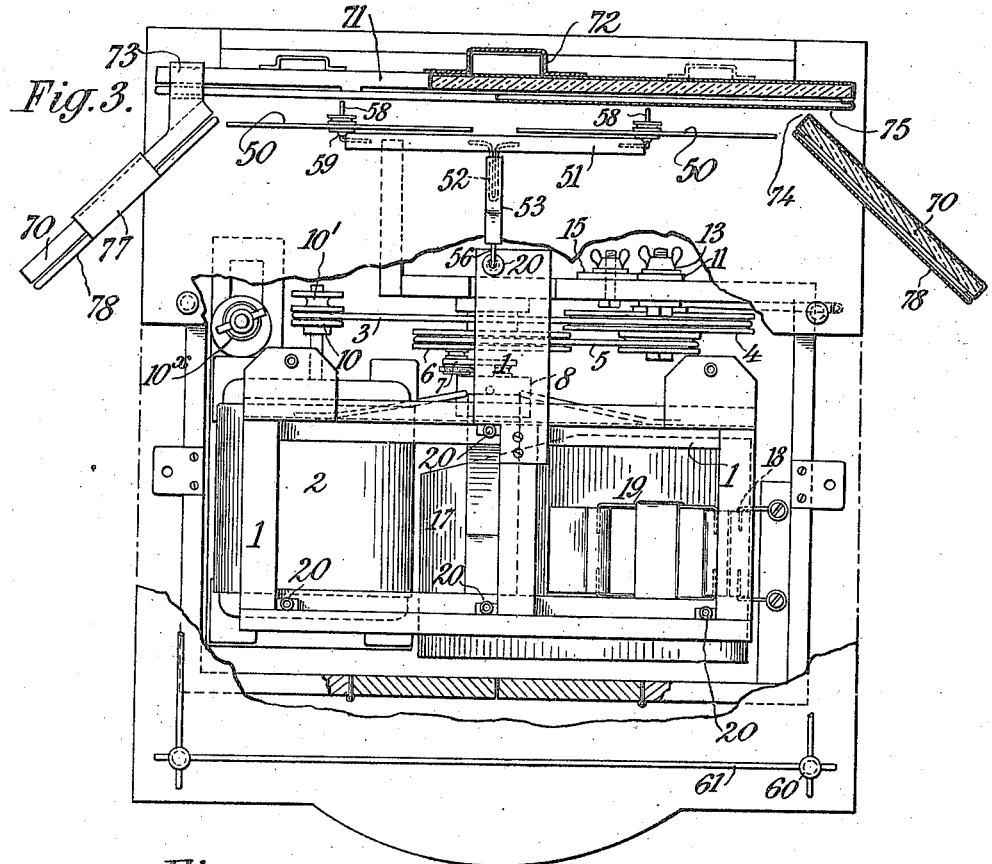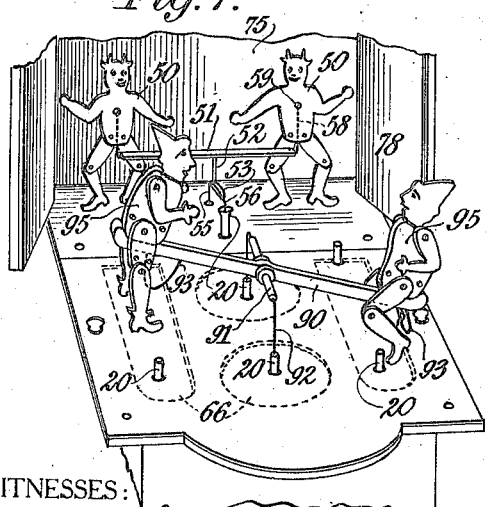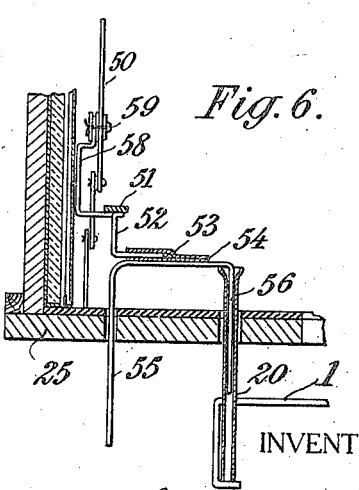

UNITED STATES PATENT OFFICE.

CLINTON H. LEGGETT, OF NEW YORK, N. Y.

ADVERTISING DEVICE.

1,264,947.   Specification of Letters Patent.   Patented May 7, 1918.

Application filed April 7, 1917. Serial No. 160,358.

*To all whom it may concern:*

Be it known that I, CLINTON H. LEGGETT, a citizen of the United States of America, residing in the borough of Manhattan, city, county, and State of New York, have invented certain new and useful Improvements in Advertising Devices, of which the following is a specification.

The present invention provides a device, preferably motor actuated, adapted to put various objects in motion, such as figures or toys, etc., for the purpose of attracting the attention of persons. The device is primarily intended to be placed in show windows to attract the attention of passersby. The actuating device is one which is capable of having the animated objects substituted, so that different figures or objects may be put in motion.

The invention further embodies a number of figures and groups which may be made to perform novel movements.

Other features of invention will be hereinafter referred to.

Embodiments of the invention are illustrated in the accompanying drawings, wherein—

Fig. 2 is a vertical sectional view of the construction shown in Fig. 1, the section being approximately on the line II—II in Fig. 1;

Fig. 3 is a top plan view with parts omitted, parts broken away, and parts in section;

Fig. 4 is a detail view of one of the figures, the view being in vertical section. The form of the figure is slightly different from that of the figure numbered 42 in Fig. 2.

Fig. 5 is a transverse view on the line V—V in Fig. 4;

Fig. 6 is a detail view in section of the connections of one of the groups of animated figures;

Fig. 7 is a perspective view of the construction, illustrating a different arrangement and subject of the figures than that shown in Fig. 1.

Figure 1:
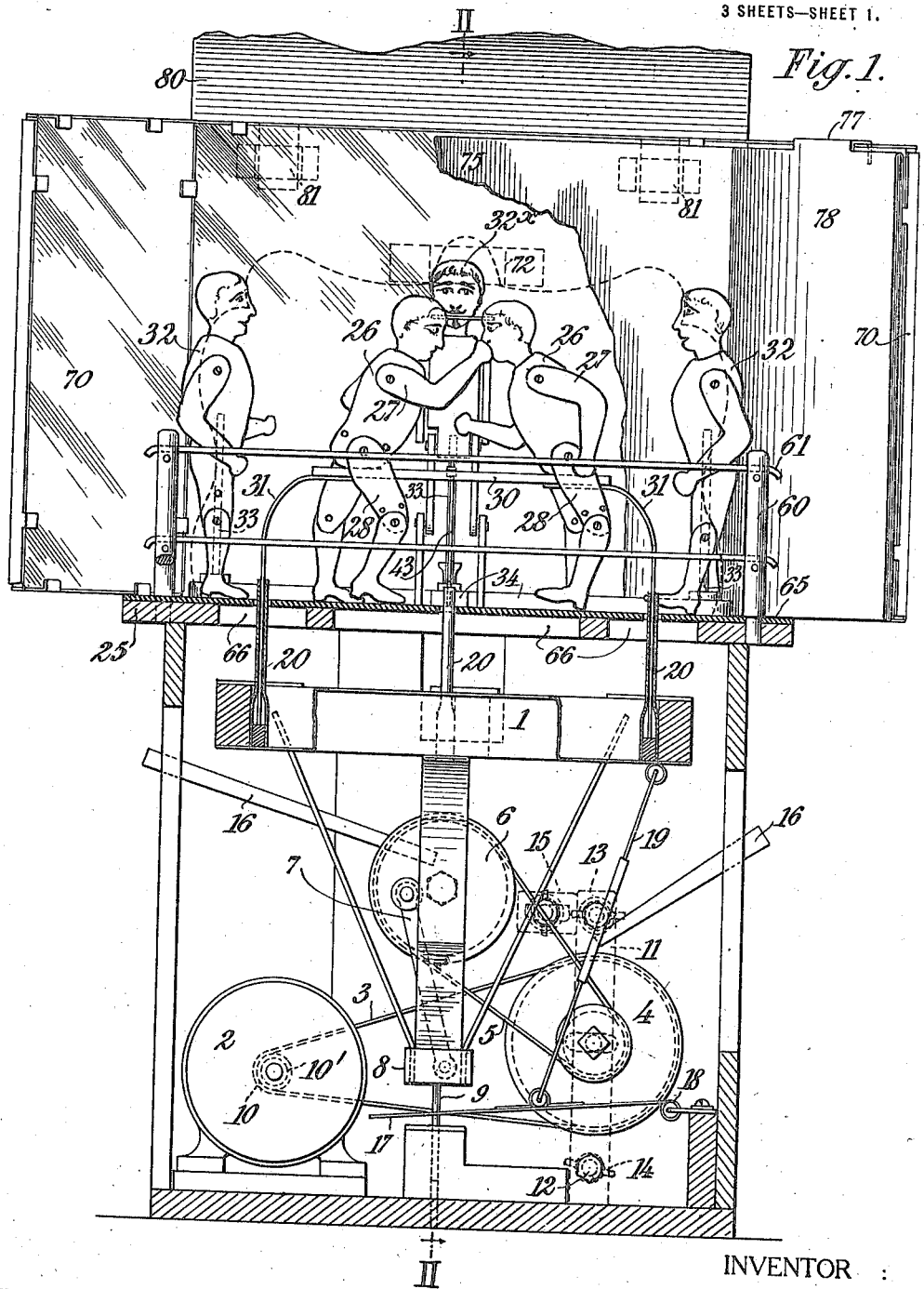
Figure 1 is a vertical sectional view of the invention, the figures upon the platform representing a prize fight, the section being approximately on the line I—I in Fig. 2.

In said drawings, the numeral 1 designates a vibrating frame, the vibratory motion being communicated thereto preferably by an electric motor 2, a transmitting mechanism comprising a belt 3, pulley 4, belt 5, pulley 6, a connecting rod 7 and cross-head 8, and a connecting piece 9.

The motor is preferably provided with several pulleys 10, 10' of different diameters. In order to bring these pulleys into line with the pulley 4, the motor is displaceably mounted, and suitable clamping means 10$^\times$ provided for fixing it in its adjusted positions.

In order to tighten the belts in a simple and convenient manner, the pulley 4 is carried by a bar 11, which bar is pivoted at 12 and which has a clamp 13 at its opposite end. By turning the bar 11 upon the pivot 12 the belts 3 and 5 may be simultaneously tightened. When the belts are tight the clamp 13 may be tightened and the bar 11 held in position. The pivot pin upon which the bar 11 turns may also be provided with a clamping nut 14, which may be tightened when the bar 11 is in position.

15 is an abutment which may be adjusted to contact with the bar 11 to hold it in place. 16, 16 are oil conduits.

In order to keep the motor cool, it is desirable to have a simple and convenient means for ventilating same. These means preferably comprise a fan 17, pivoted at 18 and connected to the vibrating frame 1 by a tie piece 19.

20, 20 designate a plurality of sockets or the like, which may be attached to the vibrating frame 1.

The socket pieces 20 preferably project through openings in the platform 25.

On the platform 25 is arranged one or more objects, such as toys, adapted to be actuated by the vibrating frame 1.

In Fig. 1 the objects represent a prize fight. On the fore part of the platform 25 are the two principals. These two principals 26, 26 have body portions and hinged arms 27 and hinged legs 28. The two figures 26 are connected by a bar 30, and this bar 30 has projections or wires 31 which fit within the sockets 20. When the vibrating frame is in motion the figures are vibrated, the arms swing in a circle, giving the impression of feints and blows, and the legs go through various motions simulating the fighter's foot-work.

At the rear of the platform are arranged the figures 32, 32, designating the seconds, and 32$^\times$ designating the referee. As the movements of the referee and seconds are not supposed to be quite as animated as those of the principals, these figures 32, 32 and 32ˣ are arranged to have a less motion. Preferably these figures are carried upon standards 33, which standards 33 are fixed to a plate 34. The plate 34 has a projecting piece or wire 35, the end of which projects into one of the sockets 20 of the frame 1. A stop 36, preferably in the form of a buffer, is arranged upon the projection 35, in such manner that the stop 36 is only brought into contact with the socket piece 20 when the socket piece 20 is near the limit of its upward vibration. The effect of the contact of the socket piece 20 upon the stop 36 upon the projection 35 is to slightly lift the plate 34. This causes the figures to move up and down slightly, giving the figures 32 and 32ˣ a slight jerky motion simulating nervous movements.

Figures 32, 32 and 32ˣ also preferably have jointed legs and arms which move slightly as the plate 34 is moved.

It is desired to give the figure 32ˣ, representing the referee, an alert and important mien. This is effected by mounting his head upon a slide 40 which may work up and down in a bore through the body. The slide 40 has a slot 41 therein through which passes a pin 42, the pin and slot limiting the up and down movements of the slide. At the base of the slide is arranged a projection or wire 43. This wire 43 is of such length that when it and the plate 34 rest upon the platform 25 at the same time, the slide 40 and head thereon is slightly lifted. When the plate 34 is lifted consequently, the body is lifted, but not the head. A succession of rising and falling movements of the plate 34 gives the impression of the stretching of the neck of the referee. Moreover, the pin 42 fits somewhat loosely in the slot 41, so that the slide 40 may wabble and consequently the head may wabble. The head consequently has a combined wabbling and turning movement, giving the impression of a manifestation by the referee of close attention to the action of the principals 26, 26.

The neck action of the figure 32ˣ may be accentuated as in the figure shown in Fig. 4.

In Fig. 4 the body portion of the toy may have a projection or wire 31 which fits within the socket piece 20 upon the vibrating frame 1. The slide 40 which carries the head has a projection or wire 43, which projection rests upon the platform 25. The body portion of the toy moves relatively to the slide 40 carrying the head. There is therefore an accentuation of the head movement, resulting in a strange or grotesque effect.

In order to give the figures a setting or background and to enhance the effect, at the rear portion of the platform may be provided a group of animated devils 50, 50 (Figs. 3 and 6). These figures 50, 50 may have hinged limbs and are joined to a bar 51 which may be actuated by the vibrating frame 1. Preferably, as indicated in Fig. 6, the bar 51 has a tongue 52 thereon which fits in a socket piece 53 upon a connecting piece 54. The connecting piece 54 has preferably two projecting portions 55 and 56. One of these projecting portions 55 and 56 fits within the socket piece 20 upon the vibrating frame 1, and the other may project through a slot in the platform 25, for the purpose of preventing the connecting piece 54 from turning. By removing the tongue 52 from the socket piece 53, various groups of figures may be substituted.

The bar 51 preferably has projections 58 thereon, the bodies of the devils being pivotally mounted thereon as indicated in 59. By such an arrangement the bodies of the devils may sway as they dance.

Around the fighting figures is preferably arranged a "ring" or fence. This fence is preferably composed of removable posts 60 and removable wires 61 simulating ropes.

It is preferable to cover the platform 25 with a rubber mat 65, and it is further preferable to cut out the platform 25, as indicated at 66, 66, beneath the portions of the rubber mat, upon which the figures dance. This arrangement not only deadens the sound, but the slight curvature of the rubber mat over the cut out portions facilitates the action of the figures. It avoids a straight line reaction being imparted to the figures through the lines of their joints.

It is desirable to heighten the effect of movement by arranging behind the scene a plurality of mirrors 70, 70 and 71. The mirror 71 is provided at its back with a socket piece 72, by which means it may be removably fixed to a projection at the back of the platform 25. The mirror 71 is also provided with brackets 73 which slide over the ends of the mirror 71. The mirrors 70 are thereby detachable from the mirror 71. Between the mirrors 70 and 71 a space 74 is left through which may be passed a slide or blind 75. The mirrors 70 are also provided with brackets 77 in which may be slid slides or blinds 78 for covering the mirrors. It is sometimes desirable to have a dark non-reflecting background, and sometimes to have a back-ground full of light. The blinds and mirrors provide for obtaining such different back-grounds.

With the mirrors it is found that the effect is sometimes improved by providing an overhanging plate or canopy 80. This is preferably arranged to be detached from the mirror, as indicated at 81.

In Fig. 7 there is shown a group of figures somewhat different from that shown in Figs. 1 et seq. In said figure numerals 95, 95 designate a pair of figures, shown in the dress of clowns. The bodies of these figures are mounted upon a beam 90, which beam is pivoted midway thereof, as indicated at 91 upon a U-shaped bar 92, the ends of which project into two of the socket pieces 20 of the vibrating frame 1. The figures 95, 95 preferably have hinged legs and arms. 93, 93 are stops upon the bar 90 for limiting the movement of said bar toward the platform. When the vibrating frame 1 is set in motion, the socket pieces 20, 20 and consequently the U-shaped bar 92 is vibrated. This vibrates the bar 90, and the bar 90 at the same time begins to swing or see-saw upon its pivot 91. The figures 95, 95 are given a combined jumping and see-sawing effect.

The inventive ideas herein illustrated and described are capable of receiving a variety of mechanical expressions.

What is claimed is:—

1. A device of the character described comprising a vibratory frame, a platform, figures, and connections between said frame and figures, whereby said figures are actuated by said frame, said figures having parts adapted to come into contact with said platform, said platform being covered with a light covering and being cut out at points beneath said figures.

2. A device of the character described comprising a vibratory frame, a motor for actuating said frame, a fan for cooling said motor, said fan being operatively connected to said frame.

3. A device of the character described comprising a vibratory frame, a motor for actuating said frame, a plurality of pulleys and belts between said motor and frame, one of said pulleys being mounted upon a shiftable part, said part being adjustable in such manner as to cause said pulley simultaneously tighten the belts passing over two adjacent pulleys.

4. A device of the character described comprising a vibratory frame, socket-pieces therein, a platform, and figures adapted to be actuated by said frame, a bar and a plurality of figures mounted on said bar, said bar having means for engaging said socket pieces.

5. A device according to claim 4, the platform being cut out under the figures and covered with a light covering.

6. A device according to claim 4, the bar being pivoted in such manner as to see-saw.

7. A device according to claim 4 including a figure adapted to be actuated by said frame in conjunction with said figures on said bar.

8. A device according to claim 4 including a figure adapted to be actuated by said frame in conjunction with said figures on said bar, a connection between said frame and platform whereby said frame is only given a minor movement.

9. A device according to claim 4, including a figure adapted to be actuated by said frame in conjunction with said figures on said bar, said figures having a head movable with relation to the body and means for supporting said head from the platform, whereby relative movement of the head and body gives the effect af neck-stretching.

10. A device according to claim 4 including a plate on said platform behind said first figures, a connection between said frame and plate whereby said plate is only given a minor movement, and figures on said plate adapted to be rendered active by movement of said plate.

11. A device according to claim 4, the figures being pivoted with respect to said bar, whereby the bodies may sway.

12. A device according to claim 4, said bar being detachably connected to said means for engaging the socket-piece.

13. A device of the character described, comprising a figure, means for vibrating said figure up and down, said figure comprising a body and a slide in said body, a head on said slide, and a support for said slide adapted to bear on a platform or the like.

14. A device according to claim 13, the slide having a movement around its axis whereby the head can turn as the body moves up and down.

15. A device of the character described comprising a figure, means for actuating said figure, and reflecting means behind said figure, said reflecting means comprising a mirror at the rear and mirrors at the side, a slide adapted to cover said rear mirror, said mirrors having a space between one another through which said slide may pass.

16. A device of the character described comprising a figure, means for actuating said figure, and reflecting means behind said figure, said reflecting means comprising a mirror at the rear and mirrors at the side, a slide adapted to cover said rear mirror, said mirrors having a space between one another through which said slide may pass, and slides for covering the said mirrors, said side mirrors having means for holding said slides.

17. A device according to claim 3, the motor having a plurality of pulleys of different diameters, and means for shifting said motor to bring the driving pulley into line with the driven pulley.

In witness whereof, I have hereunto signed my name.

CLINTON H. LEGGETT.

Copies of this patent may be obtained for five cents each, by addressing the "Commissioner of Patents, Washington, D. C."